March 5, 1968  R. L. TILLMAN  3,371,529
WIND INDICATOR SAILING AID
Filed Aug. 10, 1966  2 Sheets-Sheet 1
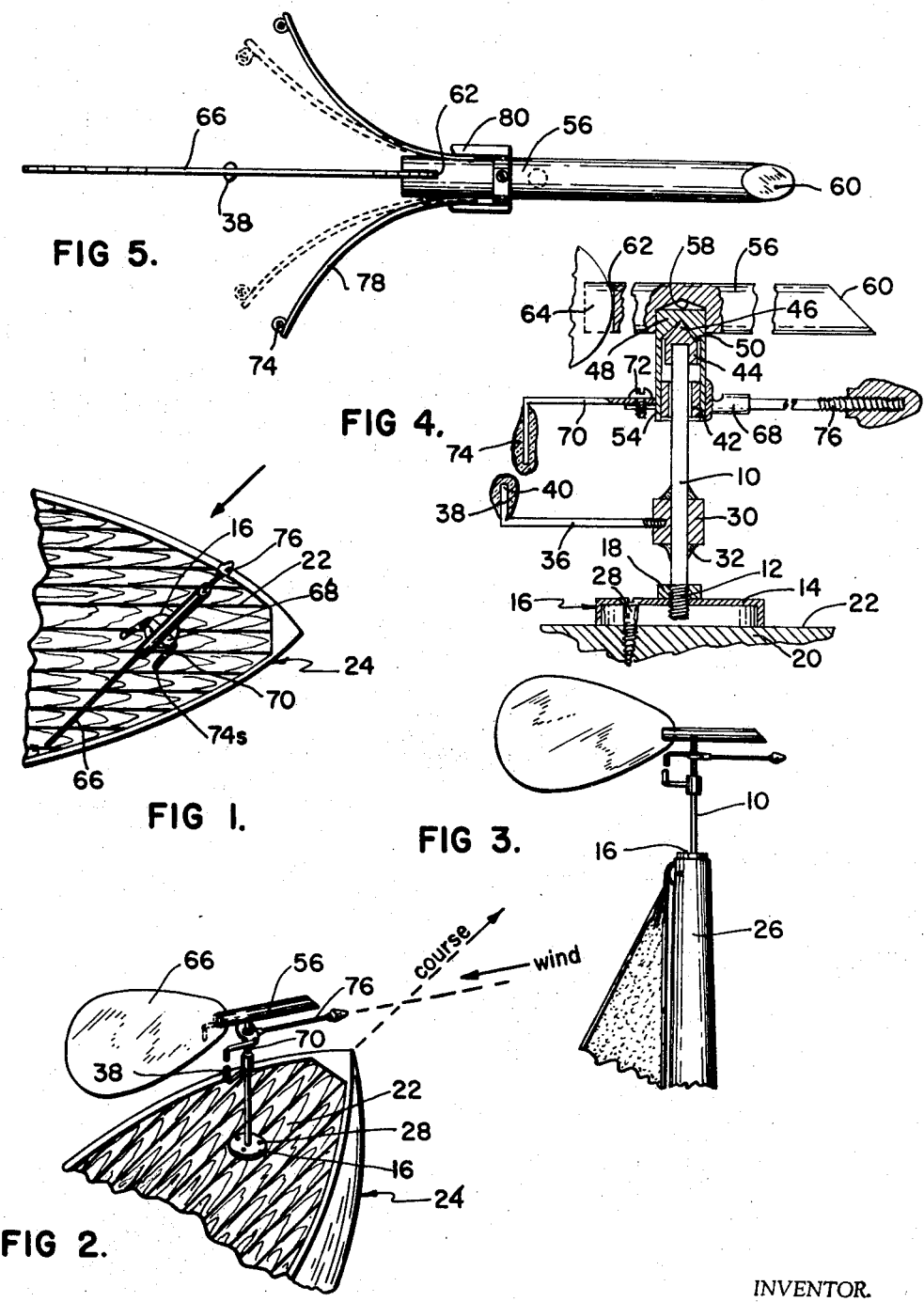
INVENTOR.
RICHARD L. TILLMAN
BY
Harbaugh & Thomas
Attys.

March 5, 1968   R. L. TILLMAN   3,371,529
WIND INDICATOR SAILING AID

Filed Aug. 10, 1966   2 Sheets-Sheet 2

INVENTOR.
RICHARD L. TILLMAN
BY
*Harbaugh & Thomas*
attys.

United States Patent Office 3,371,529
Patented Mar. 5, 1968

3,371,529
WIND INDICATOR SAILING AID
Richard L. Tillman, 174 St. Clair Ave.,
Elkhart, Ind. 46514
Filed Aug. 10, 1966, Ser. No. 571,620
8 Claims. (Cl. 73—188)

The present invention relates generally to wind direction indicators and more particularly to a wind direction and boat course correlator by which a skipper in a racing boat can steer the best course when he is going to windward in light, variable and heavy winds.

Heretofore, attempts have been made to correlate the course of a boat going to windward with some objectivity regarding a general wind direction but such do not correlate the actual wind direction, the relative wind direction and a boat having particular sailing characteristics. Many boats foot better on one tack than on the other in a particular or different wind. Furthermore, the sailing and wind response characteristics of boats change for different wind speeds and wave action with the result that a skipper, mentally, never gets his boat settled on one tack to his satisfaction before it is completed and another tack with new settings is taken. It is also to be noted that wind shifts complicate sailing and also the wind speed changes, particularly where the course is laid out close to an irregular shore line silhouette.

Moreover, in light winds, due to sail stiffness a skipper has to repeatedly check his boat's orientation by pointing the boat up to and falling off the wind to be sure he is getting the most out of his sails just below the jib or main sail luff point. Movement of the rudder for this purpose is a drag on the boat's potential speed.

However, one thing is accepted with most sailing boats of every racing class, and that is that a boat will appear to point higher in a strong wind than in a light wind and each boat can be tuned in a preliminary test for the best hull heel below the sail luff point for optimum speed and course for wind conditions prevalent on any particular body of water.

The essential inventive concept is to provide an indicator which indicates to the skipper the optimum course to be sailed to windward in any wind condition, and particularly the boat direction which is below the luff point with the boat's hull heeled to its best wetter surface running line. The indicator can initially be used to adjust and tune the boat's rigging to point and foot better than other boats in the same class under determined wind velocities, and, thereafter be used to indicate the best relative course for that boat with respect to any wind speed and direction under racing conditions including automatic allowances for changes in wind speed as well as wind shifts. In doing this the wind indicator sailing aid is so constructed and arranged that the orientation of the boat's keel with respect to the wind direction can be determined at a glance by the skipper in which a single indicator located in one plane when seen between two other indicators spaced in another plane indicates the boat is too high to the wind while if outside the two spaced indicators such indicates that the boat is too low on the wind for best results. The skipper's natural response is to move the tiller in the same direction that moves the single indicator into coincidence with one or the other of the two spaced indicators, depending on the tack.

More particularly, the invention is characterized by a wind vane and three small indicators with one indicator stationary as aligned with the vane axis on or parallel to the fore and aft centerline of the boat and the other two carried by the wind vane as positioned on opposite sides thereof, each at an approximately a 45° angle to the centerline of the wind vane. In using them the skipper steers the boat so that the windward indicator and the stationary indicator are in alignment.

One of the objects of the invention is to provide a pivoted wind vane carrying two small spaced indicators which alternately cooperate with a fixed indicator to indicate the optimum sailing angle to a given relative wind direction.

Another object of the invention is to provide a sensitive, accurate and continuous, direct reading instrument which indicates the optimum course for progress to weather and speed through the water, and to what degree, if any, the skipper is off this course at any instant.

A further object of the invention is to vary automatically the angles between the vane and the indicators carried on the vane in a relationship that is proportioned to the speed of the wind.

Another object of the invention is to provide a relative wind-course relationship indicator for a sailing boat which can be located any place convenient upon a boat and particularly at the bow where there is no wind obstruction and where the skipper at the helm can watch both the jib, or main sail alone in the case of a cat boat, and indicator and read the indicator at a glance.

A further object of the invention is to provide a sailing aid which serves as a quick visual check on the pointing angle of the boat in gusty variable winds; is immediately responsive to rapidly shifting winds for vigorous competitive steering of the boat for every advantage; and enables the skipper to immediately assume the proper windward course when completing a tack or rounding a leeward mark with a quick sail trim on the new course.

Another object of the invention is to vary inversely the angle between the indicators carried on the vane and their pivoted mount in relation to the speed of the wind while directly indicating at a glance the optimum course the boat should be steered under any and all wind speed conditions.

Other objects of the invention include an accurate, easily made product that is rugged under all wind conditions and immediately responds to the slightest wind and to any wind change when such becomes effective upon the sails.

These being among the objects of the invention, other and further objects will be disclosed in the description of the drawings in which:

FIG. 1 is a perspective view of the bow portion of a sail boat with one of the embodiments of the invention mounted thereon and operating with the wind forward of the port beam;

FIG. 2 is a plan view of and the embodiment shown in FIG. 1 with the boat going to windward on a starboard tack;

FIG. 3 is a side elevation of the device as mounted on top of the mast of the ship;

FIG. 4 is an enlarged longitudinal section through the bearing portion of the device shown in FIG. 1;

FIGS. 5 and 6 are top and side elevational views, respectively, of the vane portion of the indicators showing another embodiment of the invention.

Figure 6:
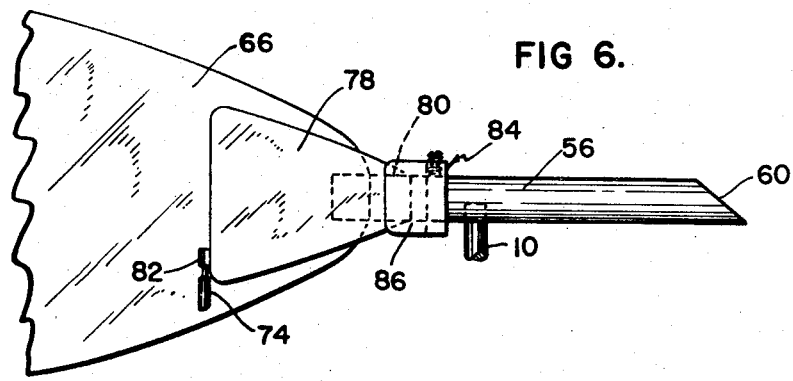

Referring now to FIGS. 1–4, the basic construction embodying the invention is shown in which an upright stem 10 is threaded at its lower end 12 into the bottom 14 of an inverted cup 16 as locked in a relative non-rotational position with respect thereto by a lock nut 18. The cup member 16 has its rim 20 held against the fore deck 22 (FIG. 1) of a keel or centerboard boat 24, or the top end of the mast 26 (FIG. 3) in whichever location desired, as secured by screws 28.

Near the top of the stem 10 a collar 30 is secured to the stem by an epoxy glue 32 and is apertured at 34 to receive the end of a hook or hanger 36 having an upturned front end indicator 38 coated or covered with a luminous material 40 which preferably is a brilliant orange color. Once the cup 16 is secured in place, the lock nut 18 is adjusted so that the hanger 36 aligns with the keel (not shown) or centerline of the boat 24.

The upper end of the stem 10 receive a sleeve 42 loosely therein and a cap 44 tightly thereon as secured by epoxy. The upper end of the cap 44 provides a needle point bearing member 46 supporting a hood member 48 with a cavity 50 in the bottom thereof defining the conical concavity of the needle bearing and receiving the sleeve 42 therein assecured to the wall 54 of the hood 48 by epoxy glue to journal the stem 10 and prevent removal of the hood.

A horizontal rod 56 is drilled out at 58 to receive the hood vertically therein as secured by a press fit (or epoxy glue). The front end of the rod is mitered at 60 to impose a downward thrust thereon by the wind and the other end is vertically kerfed at 62 to receive the leading edge 64 of a wind vane 66 of large area whose shape, density and thickness is such as to mutually balance with the rod 56 and a reasonable sized counter-balance 76. The vane is secured in the kerf by a solvent glue.

A clamp 68 is secured to the lower end of the hood and carries outrigger arms 70 that are horizontally and adjustably supported by screws 72 at their outer ends. The two arms 70 have downwardly extending tell-tale indicators 74 of luminous color cooperating with the single indicator 38 in a plane above it. The clamp also carries an adjustable counter-balance 76 for balancing the vertical load on the needle bearing 46 and lessening the frictional drag of any radial load imposed on the sleeve 52.

By way of furthering the understanding of other embodiments of the invention yet to be described, it is well to note at this time that in operation, once the instrument is assembled and the cup 16 is secured in place with the hanger 36 in alignment with the center line of the boat as located on the fore deck the skipper can easily keep an eye on it while watching many other things requiring his attention. During tune up the boat can be sailed on either tack into the wind, i.e., on a beat, and the shrouds, stays and other rigging adjusted for the best sailing results for the best hull speed just below a luff of the sails. The indicator will assist in this by the relative positions of each vane indicator to the single indicator on each tack, whereupon the appropriate screws 72 can be loosened, and the angles of the arms 70 adjusted so that the indicators are vertically aligned where the best results of course-to-wind directions are established. Alternate repetition on the different tacks enable setting the two indicators to the skipper's satisfaction.

Thereafter during a race, a visual illusion is created that the two spaced indicators 74 are stationary according to the wind direction and the one indicator 38 is movable by the tiller. If the boat begins to point high enough into the wind to cause the sails to luff, the one indicator moves to a position between the two indicators and thereby indicates that the skipper must move the tiller outwardly if he is to have the single indicator move outwardly to recover alignment. For instance, if the boat is on a port tack, the port indicator 74p is cooperating with the one indicator 38 and if the boat begins to come up into the wind the single indicator will seem to move towards the center of the boat because the port indicator moves more to port whereupon the skipper will have to move the tiller towards the port side for well known steering reasons to "move" the single indicator back towards the port for recovery of indicator alignment. The reverse would be true if the boat tended to fall off with the wind.

It is also to be noted that boats seem to sail higher into a heavy wind without luffing whereas in light winds they have to lay off to keep the sail full and driving. This also is somewhat of an illusion because with heavier winds the boat moves faster into the wind and the relative or apparent direction of the wind is a vector between the forward boat direction and the actual wind direction, plus the better fill of the sails enable by a heavier wind which, although on a higher course prevents an apparent luff as far as a skipper sailing by sail-luff alone is concerned. Staying just below the sail-luff point still may not provide the expected or full potential drive that is present at a point a little farther below the heavy wind luff point where the indicator indicates the optimum course is for ultimate results.

Another factor involved is that skippers appreicate that the speed increases of the apparent wind are due in part to the faster forward motion of the boat, but many will debate the question whether keel or center board area foreshorted by the heel of the hull plays a major part in this because of side slip. It may or may not depending on hull design. The argument is also made that the effective direction of a boat under heavy winds is not changed as much as expected from the higher steering point because side slips tends to shift the wind effect towards the beam. Another argument that wind spill out of laterally inclined sails gives a forward drive force also adds to the confusion.

All of this indicates that whatever is happening to the boat can be reduced to a common denominator, namely, apparent wind speed-direction. Thus, the indicators being related to the apparent wind speed-direction and course direction, when adjusted for a particular boat and its tested performance, provides a skipper, whether novice or expert, with a composite unitary and continuing indication for quick reference to which skippers respond with a natural steering reaction. This grows with confidence from success in relying on the indicator.

In FIGS. 5 to 8 two embodiments are shown where the angle between the two indicators is automatically varied in relationship to wind speed to allow for and to indicate the best performance direction of the boat with respect to different wind speeds irrespective of but below the luff point.

In FIGS. 5 and 6 wind pressure responsive flexing vanes 78 are substituted for the arm supports 70 to carry the two indicators 74. The wings are curved outwardly from their leading edges 80 with the leading portions secured by epoxy glue upon the sides of the rod 56 and the indicators are carried near the trailing edge on adjustable elements 82 to cooperate with the fixed indicator 38. A collar 84 is adjustably mounted on the rod 56 and has fingers 86 engaging the outer surfaces of the wings 78 near their front edges so that as fingers are adjusted rearwardly they deflect the wings with an adjustable result to adapt the device for different boats with respect to light wind performance. Boats which point comparatively high in light winds generally have a narrow angle of course change between light and heavy winds and this in turn is related to relative area and weight characteristics of the keel. The two wings are equal and opposite in their wind response, thereby balancing out each other with enough space between them to permit the vane to perform with accuracy with respect to the apparent wind direction.

Figure 7:
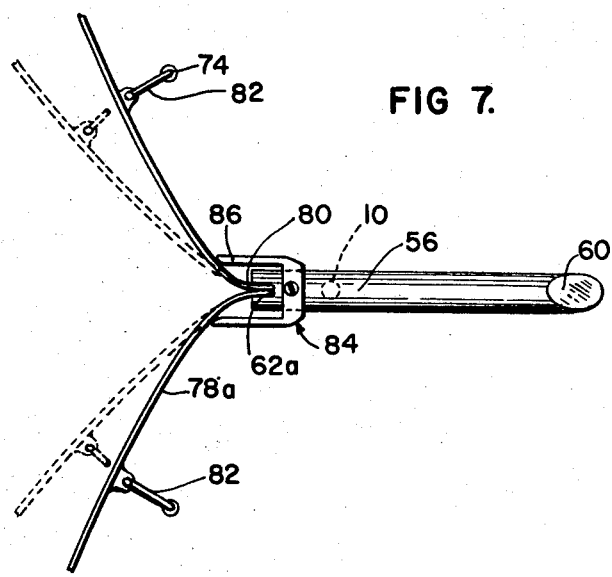
FIGS. 7 and 8 are top and side elevational views, respectively, showing another embodiment of the invention in which wind speed sensers serve as a direction vane also.
Figure 8:
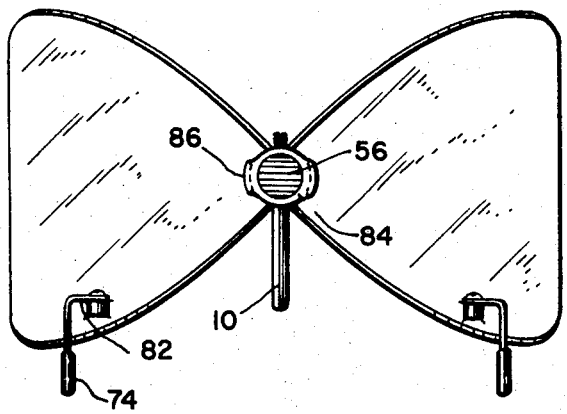

In FIGS. 7 and 8 the outwardly curved wings 78a are enlarged to vane size areas and the straight vane 66 is eliminated. In this relationship the front edges are preferably secured together in the kerf 62a so that a vacuum effect developing behind them is a force in addition to wind pressure on the front faces to flex them towards each other under heavy wind conditions, each balancing one another so that the apparent wind direction is accurately indicated.

Although the vanes can be made of any sheet material it is preferred that they be transparent so that they do not detract from immediate perception of the indicators by the skipper.

The stem can be maintained upright by mounting it on a gimbal but such has not been found to be necessary since if the wind is a rising one from the water the indicator will respond in part to it to indicate a more aft apparent wind and if the wind had a downward driving factor, the indicator will indicate it as a more forward apparent wind and the response of the indicator will include this factor for proper response by the skipper. Also the vane is balanced so that it will give a true reading even if the boat is heeled by the crew in light weather to keep the sails full.

More significant however, is the indication concomitant of the indicator when the boat is brought about from one tack to the other. The boat momentarily heads into the wind and slows before it heels on its new tack. The indicator is particularly helpful in coming to the correct course, bringing the sails to the proper set and getting the boat under way again with the least delay.

It will be appreciated that an electrical servo mechanism based on the Selsyn principle can be employed for remote reading if desired with only two relatively moving points to correlate at a given time.

Having thus described the several embodiments of the invention it will be readily apparent to those skilled in the art of instrumentation and sailing how the various objects and advantages are attained and how various modifications and changes can be made therein without departing from the spirit of the invention, the scope of which is commensurate with the appended claims.

What is claimed is:

1. A relative wind direction sailing aid for a boat comprising a wind vane, means for mounting the wind vane means for pivotal movement about a predetermined axis on the boat, means for supporting a first indicator a predetermined distance from said axis in fixed relation with respect to the boat, a pair of spaced indicators, means carried by said wind vane means for supporting said spaced indicators at said predetermined distance from said axis for cooperation with said first indicator as the wind vane means turns with respect to the first indicator when located half way between spaced indicators when the center line of the boat and the wind driection coincide.

2. The combination called for in claim 1 in which said wind vane means comprises two diverging wind vanes flexing towards each other under increased wind speeds and said carrying means for said spaced indicators being secured to said two diverging wind vanes.

3. The combination called for in claim 1 in which said pair of spaced indicators are disposed to move in a plane spaced from said first indicator.

4. The combination called for in claim 1 in which said wind vane comprises two diverging wind vanes constituting the sole wind responsive elements, said wind vanes being secured at their leading edges and defining an increasing space between them towards their free edges.

5. The combination called for in claim 3 in which said first indicator and said predetermined axis are aligned in parallel relationship with the longitudinal center line of the boat and with the first indicator disposed aft of said predetermined axis.

6. The combination called for in claim 3 in which said mounting means includes a vertical stem having a needle point at the top, a collar secured thereto, a hanger secured to the collar and supporting said first indicator in upstanding relationship below the wind vane means, said wind vane means including a cap received on said stem and having a concavity with a contour cooperating with said needle point and supporting said spaced indicator carrying means, and said vane means including a rod receiving said cap in supported relation and having the vane means secured at one end, and counter balance means carried by said cap for balancing the weight of the wind vane and said pair of indicators.

7. The combination called for in claim 1 in which said wind vane means comprises two diverging wind vanes flexing towards each other under increased wind speeds and said carrying means for said spaced indicators being secured to said two diverging wind vanes including means carried by said mounting means for the two vanes for adjustably varying the angle of divergence of said vanes under no wind conditions.

8. A wind teller for sail boats comprising an upright member secured to the fore deck of a sailing boat, a fixed indicator carried by said upright and spaced therefrom in a direction parallel to the keel of the boat, a wind vane means pivoted to the upright and having two horizontally spaced indicators spaced from said upright a distance approximately the same distance as the fixed indicator, the included angle defined by the two being approximately twice the angle between the best course sailable by the boat in high winds and the direction of such winds.

References Cited

UNITED STATES PATENTS

| | | | |
|---|---|---|---|
| 1,213,714 | 1/1917 | Washburne et al. | 73—188 |
| 1,969,206 | 8/1934 | Castendijk | 73—189 |
| 2,363,087 | 11/1944 | Salisbury | 73—188 |
| 2,681,569 | 6/1954 | Hirschoff | 73—188 |
| 3,049,008 | 8/1962 | Polster | 73—188 |

RICHARD C. QUEISSER, *Primary Examiner.*

J. MYRACLE, *Assistant Examiner.*